C. Buss,
Vise.

N° 14,795.  Patented May 6, 1856.

UNITED STATES PATENT OFFICE.

CHARLES BUSS, OF MARLBORO, NEW HAMPSHIRE.

VISE.

Specification of Letters Patent No. 14,795, dated May 6, 1856.

*To all whom it may concern:*

Be it known that I, CHARLES BUSS, of Marlboro, in the county of Cheshire and State of New Hampshire, have invented a new and useful Improvement in Vises; and I do hereby declare that the following is a full, clear, and exact description of the construction and operation of the same, reference being had to the drawings herewith presented and to the letters of reference marked thereon, in which—

Figure 1:
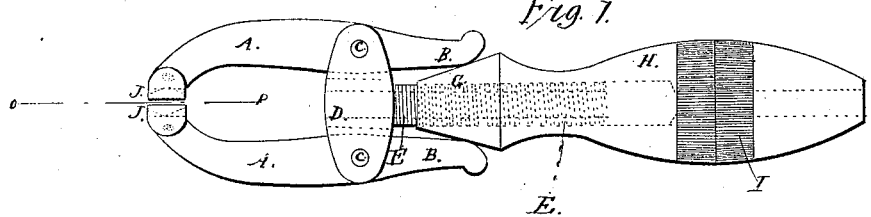
Figure 2:
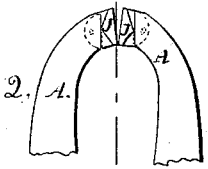
Figure 3:
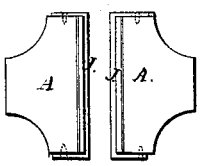
Figure 4:
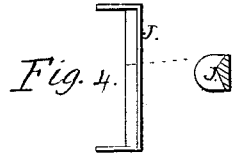
Figure 5:
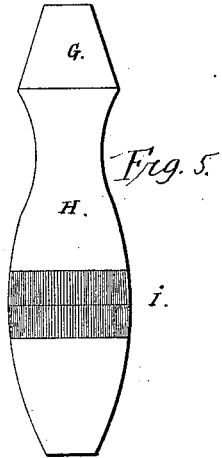

Figure 1 shows the vise complete, Fig. 2 shows a section of the jaws, Fig. 3 is a top view of the jaws, Fig. 4 shows one of the auxiliary jaws and a section of it, Fig. 5 the wedge and handle.

To construct my improved vise I make the jaws A A with the parts B B extending down below the joints C C, and the piece D with two flanges for the jaws to play in and to secure them by the pins C C to form the joints, and having a part E extending down from it with a screw thread cut thereon, and having a hole through D and E, on the part E fit the wedge G with a thread on its inside, and it may be attached to the handle H which has a milled band I to facilitate turning it. The jaws A A are of the usual form and to them I attach the auxiliary jaws J J with their lips by which they are pinned loosely to the sides of A A to allow the necessary play in accommodating themselves to the taper forms as seen in Fig. 2.

The operation is, on placing anything between the jaws and turning the handle H the thread draws the wedge G between the parts B, B, and by the pins C, C, the pressure is transferred to the jaws A A and J J, the latter adjusting themselves to the surface of the work whether straight or taper in the direction of the line O, P. It will be seen that the two jaws A A open equally, thus always holding the various sizes on a line with the center of the handle, or in other words straight therewith, and the jaws J, J, will enable the workman to hold taper drills or work tapering in its length to advantage. The wedge G may be square and slide on the part E and the handle only have the thread in it, in which case the wedge is to be a separate piece, and various forms or applications to the handle made to facilitate turning it, instead of the milled band, without varying the principle of one part of my improvement, as I do not claim the particular form or arrangement of the parts, but What I do claim as new and desire to secure by Letters Patent is—

1. I claim making the movable jaws A A with the parts B B extending beyond the joints so as to be operated by the wedge G or its equivalent as above set forth and described.

2. I claim making both jaws movable so as to open equally and hold the various sizes on a line with the center of the whole tool as described.

CHARLES BUSS.

Witnesses:
DAVID M. WOODWARD,
JAS. G. ARNOLD.